Figure 1:
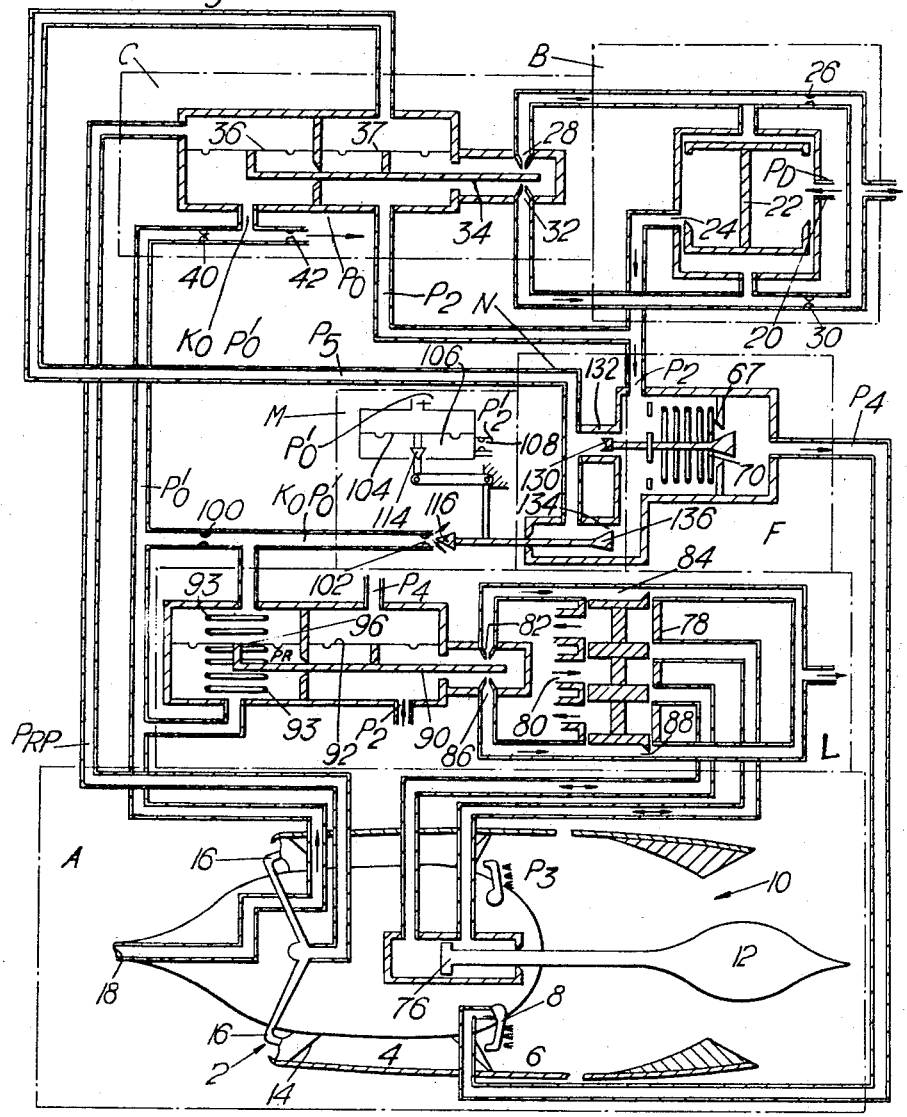

Fig.5.

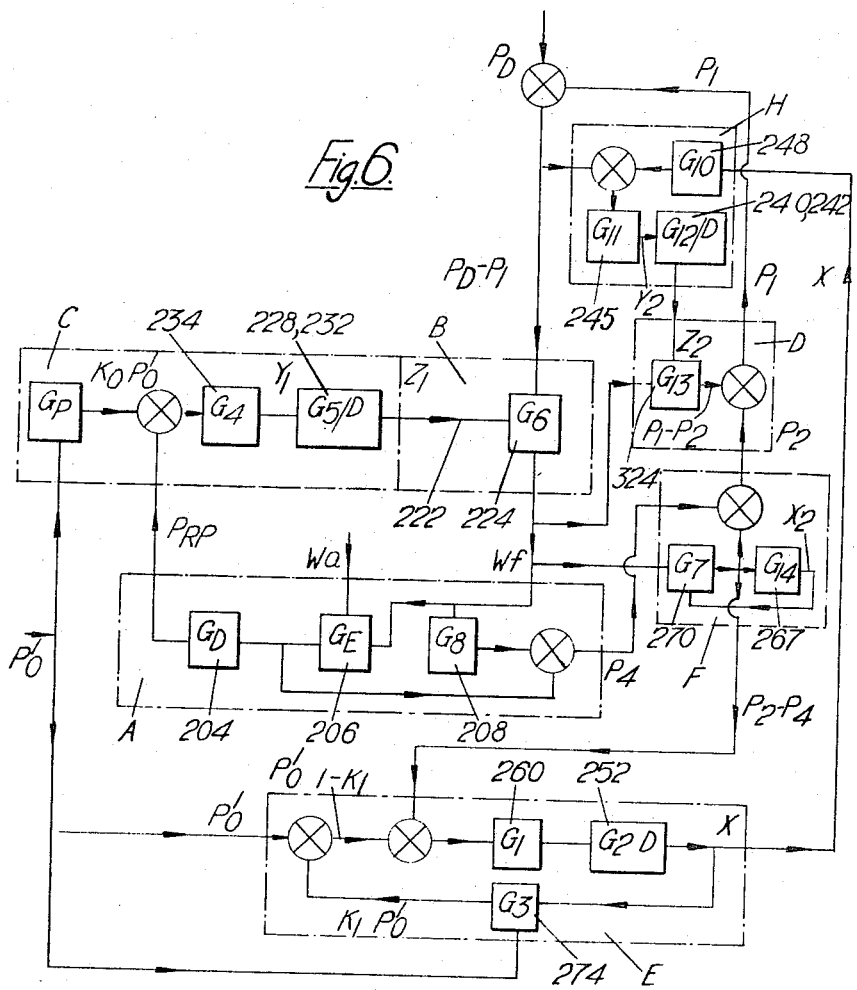

United States Patent Office 3,314,238
Patented Apr. 18, 1967

3,314,238
JET ENGINE SHOCK WAVE CONTROL INCLUDING FUEL SUPPLY AND EXHAUST NOZZLE REGULATION
Ronald Rimmer, Churchdown, Gloucester, and Nigel Millgrove Miller, Bath, Somerset, England, assignors to Bristol Siddeley Engines Limited, Bristol, England, a British company
Filed May 26, 1965, Ser. No. 459,052
Claims priority, application Great Britain, May 28, 1964, 22,194/64, 22,195/64
7 Claims. (Cl. 60—235)

This invention relates to control systems for fluid-fueled air-breathing engines for aircraft for flight at supersonic speeds. (The word "aircraft" includes missiles.) The engines may be ramjet engines, or turbojet engines, or combined ramjet-turbojet engines. The engines may have an exhaust nozzle the throat area of which is adjustable, and may have a variable-geometry air intake.

If the engine is designed for subsonic airflow speeds in the combustion zone, then during operation a normal shock wave occurs where the velocity of the intake air relatively to the engine changes from a supersonic to a subsonic value. For efficient operation of the intake diffuser, it is necessary that the position of the normal shock wave should remain fixed within narrow limits—a situation described as "operation at critical pressure recovery," and this entails controlling the pressures within the engine, upon which the position of the normal shock wave depends. Analogous requirements arise if the engine is designed for sonic or supersonic combustion flows. The pressure control can be effected in various ways, more particularly by varying one or more of the following factors; intake throat area, exhaust nozzle throat area, fuel flow; or by discharging part of the intake air from upstream of the combustion zone. It is also in practice necessary to provide for maintaining the thrust at a selected value, and for varying this value, which again may be done by varying one or more of the above-mentioned factors. It is possible to vary two of the factors at once in a coordinated manner, so as to vary the thrust while maintaining critical pressure recovery.

One convenient procedure is to regulate fuel flow to produce the required engine thrust and to regulate the exhaust nozzle area to maintain intake operation at critical pressure recovery.

If the converse procedure is used, so that fuel flow is regulated to maintain intake operation at critical pressure recovery, and exhaust nozzle area is regulated to produce the required engine thrust, the response requirements of the nozzle adjusting system become less stringent, and this procedure is therefore preferred.

In each case, additional control is necessary to prevent transgression of the limits of fuel-and-air-mixture combustibility.

The present invention is primarily concerned with obtaining stability, under a wide range of operating conditions, in a closed servo loop including a fuel flow control valve and a reversed pitot tube arranged for sensing displacement of a normal shock wave in the air intake of the engine, in engine control systems operating according to the converse procedure referred to above.

The present invention provides control systems in which the fuel system gain, i.e., the ratio of change in fuel flow to engine condition error, is compensated for variations in the engine gain, i.e., the ratio of change in combustion pressure to change in fuel flow.

Figure 2:
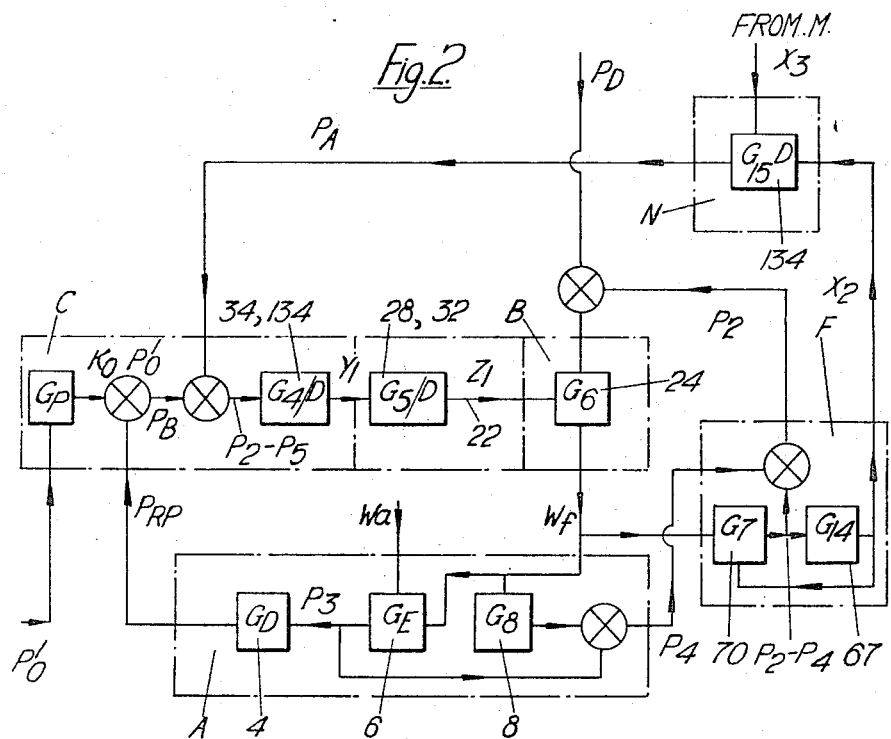
Figure 3:
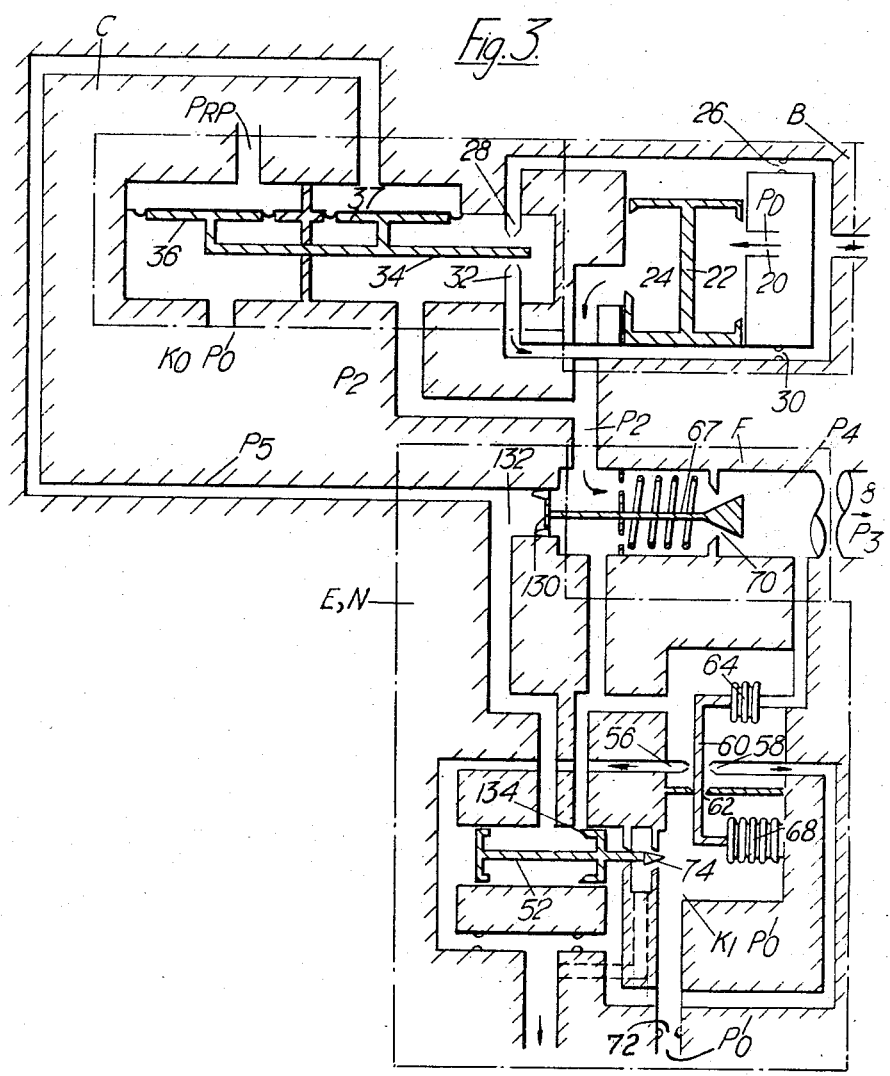
Figure 4:
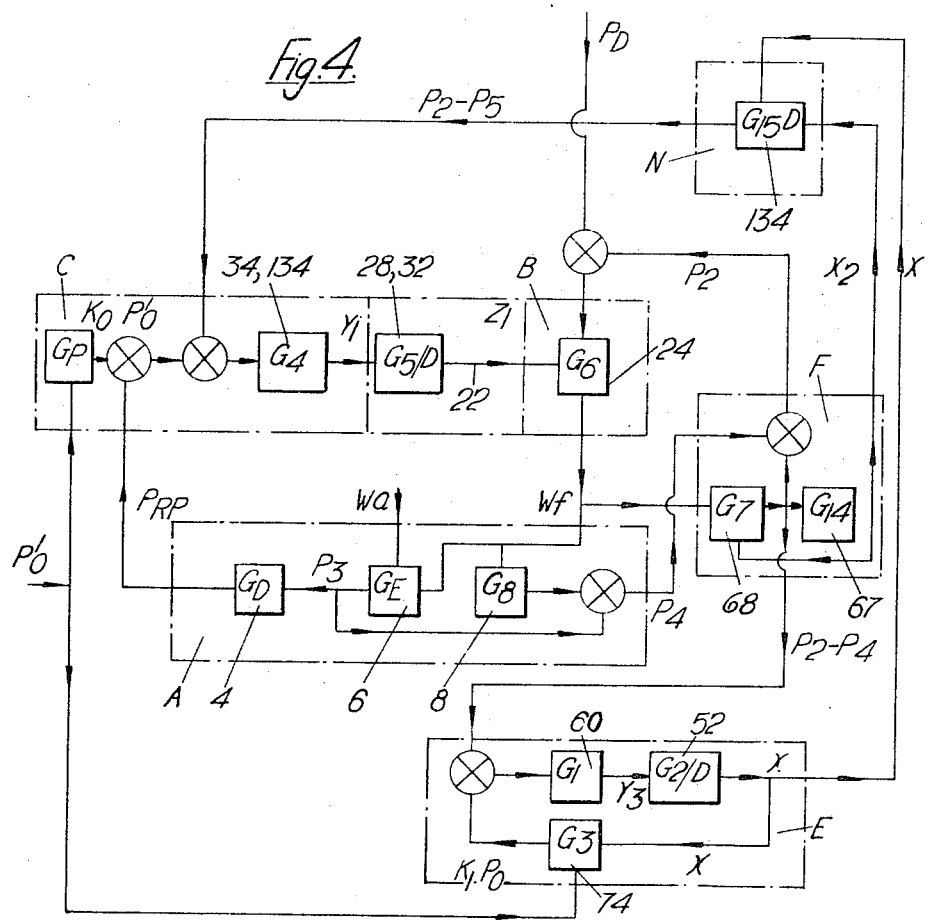

This will be explained with reference to three examples of control systems according to the present invention, which are shown in the accompanying drawings. In these drawings:

FIGURE 1 is a diagram of one system;
FIGURE 2 is a block diagram of the interrelationship of the components of part of this system;
FIGURE 3 is a diagram of a second system;
FIGURE 4 is a block diagram of the interrelationship of the parts of this second system;
FIGURE 5 is a diagram of a third system; and
FIGURE 6 is a block diagram of the interrelationship of the components of part of this system.

In the system shown in FIGURE 1, fuel is fed to an engine A at a rate controlled by a main fuel valve B. The valve B is controlled by a critical control sensing unit C, the function of which is to ensure that the fuel flow is adjusted so as to maintain critical pressure recovery in the engine. The fuel flow through the valve B depends not only on the setting of the valve, but also on the pressure difference across it. Since the system is a closed loop system, to prevent the situation leading to unstable operation, a fuel flow metering valve F and a dastpot unit N are arranged to feed back to the unit C a signal representing the rate of change of fuel flow. Moreover this signal is modulated by a signal representing the fuel-to-air ratio in the engine. The significance of this arises from the discovery that the main cause of variations in the gain in the engine (that is to say the change in pressure within the combustion chamber for a given change in fuel flow) is variations in the fuel-to-air ratio, and the system is arranged to reduce the gain of the unit C to compensate for increase of gain in the engine and vice versa. The signal representing fuel-to-air ratio is derived from a Machmeter M.

The components so far mentioned are arranged so that critical pressure recovery is maintained constant by regulation of fuel flow. The thrust of the engine is regulated by regulating the area of the exhaust nozzle of the engine A by means of a variable plug. The plug is controlled by a plug control L, which receives signals indicative of fuel-to-air ratio, and also receives signals from a Machmeter M.

The engine A has a supersonic inlet 2, a subsonic diffuser 4, a combustor 6 with a fuel spray 8, and a nozzle 10 with a variable plug 12. For critical pressure recovery in the intake, a normal shock wave should be maintained at a position 14, and movements of this shock wave are detected by a system of reversed pitot tubes 16 abreast of the lip of the inlet 2. On the very front of the engine is a forward-facing pitot tube 18 for measuring Rayleigh pressure $P'_0$.

Fuel is supplied to the main fuel valve B at 20. The valve includes a piston member 22 controlling a port 24. The piston is displaceable by a servo system using fuel as the servo liquid. The upper and lower sides of the piston are exposed to the intermediate pressures in pressure potentiometers constituted respectively by restrictors 26, 28 and 30, 32. The downstream restrictors 26 and 30 are fixed. The upstream restrictors 28 and 32 are differentially variable, because they are in the form of nozzles directed at opposite sides of a flapper 34 in the critical sensing unit C. Movements of the flapper 34 are determined by the difference in pressures above and below a diaphragm 36, and by the difference in pressures below and above a diaphragm 37. The upper side of the diaphragm 36 is subjected to reversed pitot pressure $P_{RP}$. The lower side of the diaphragm is subjected to a pressure which is a fraction of the Rayleigh pressure $P'_0$. This fraction is produced by a pressure potentiometer consisting of restrictors 40 and 42, the downstream end of the potentiometer being subjected to static pressure $P_0$. The downstream restrictor 42 may be adjusted by a needle (not shown) which is preset in order to obtain a satisfactory mean position of the shock wave in the engine intake. The pressure difference $P_2-P_5$ across the diaphragm 37 is equal to the pressure drop across a restriction 134 in the dashpot unit N. This is the sum of a pressure drop $P_A$ due to any rate of flow caused by movements of a piston 130, described more fully below, and pressure drop $P_B$ due to any rate of flow caused by movements of the diaphragm 37 itself. If $P_A$ is zero, then for any rate of movement of the diaphragm 37 there is a proportional pressure difference, and the converse is also true.

Consider now in FIGURE 2 the servo loop through the units A, C and B. A displacement of the shock wave in the engine intake will cause a change in the reversed pitot pressure $P_{RP}$. The difference between this and the selected fraction of Rayleigh pressure $K_0P'_0$ acts on the diaphragm 36, causing displacement $y_1$ of the flapper 34 at a rate such as to establish a pressure difference across the diaphragm 37 in balance with the pressure difference across the diaphragm 36. The flapper and diaphragms, in conjunction with the restriction 134, are represented in FIGURE 2 as having a transfer function $G_4/D$. This displacement $y_1$ acts through the restrictors 28, 32 to produce, through a transfer function $G_5/D$, a progressive change of displacement $Z_1$ of the piston member 22 in the main fuel valve B. This varies the area of the port 24 and thus, with a gain $G_6$, produces a fuel flow $W_f$ to the engine A. In the engine, a change in a fuel flow produces a change in pressure $P_3$ in the combustion chamber 6, with a gain $G_E$. This, through a gain $G_D$ in the diffuser 4, produces a change in the reverse pitot pressure $P_{RP}$. In this servo loop, not all the gains are constant factors; for example the transfer function $G_5/D$ involves integration ("D" being a differential operator). However, what is most important in consideration of the stability of this servo loop is that the gain $G_6$ varies according to the magnitude of the pressure difference across the main fuel valve B, namely $P_D-P_2$, and the gain $G_E$ in the engine depends on the rate of flow of air $W_a$, in relation to the rate of flow of fuel, i.e., on the fuel-to-air ratio.

Now, in practice, the supply of fuel is derived from a pump, the delivery pressure of which drops considerably as the altitude at which the system is operating increases. In addition, it is found that, over the range of possible conditions of operation of the engine, the engine gain $G_E$ may vary by a factor of 5. For stability of the system, it is desirable that the total gain round the loop should not fluctuate by more than about plus or minus 20%, but, in the absence of some system of compensation, very much greater fluctuations will occur.

The fuel metering valve F is of a known type constructed so that the pressure drop across it is directly proportional to the flow through it. It contains a spring-loaded member 67 controlling an orifice 70, through which fuel flows on its way to the engine. The pressure drop $P_2-P_4$ across the valve F is a function of fuel flow $W_f$ and of the displacement $x_2$ of the member 67, with gain $G_7$, and the displacement $x_2$ of the member 67 is in turn a function of the pressure drop, with gain $G_{14}$. The valve is so designed that $P_2-P_4$ is in fact directly proportional to $W_f$. Moreover $x_2$ is directly proportional to $W_f$. The member 67 is connected to a dashpot piston 130 in a cylinder 132. The two ends of the cylinder are interconnected through the restriction 134, which is controlled by a needle 136. This needle is actuated by the Machmeter M, described below. The righthand end of the cylinder is exposed to the pressure $P_2$, and this pressure is applied to the lower side of the diaphragm 37 in the unit C. Whenever the dashpot piston 130 moves, it displaces fuel through the restriction 134, and so a pressure difference $P_A$ is established across the restriction 134, dependent on the rate of change of $x_2$, with a transfer function $G_{15}D$ (the operator "D" here indicating differentiation). The pressure difference is combined with any pressure difference $P_B$ and is applied to the diaphragm 37 as the pressure difference $P_2-P_5$. It will be seen in FIGURE 2 that there is thus a servo loop through C, B, F and N.

The transfer function $G_{15}D$ is modulated by the displacement $x_3$ of the needle 136 which varies the restriction 134. This displacement is proportional to the output of the Machmeter. Starting from a datum condition of rich fuel-to-air ratio, changes in Machmeter output are substantially proportional to changes in fuel-to-air ratio. Thus the signal fed back to the flapper 34 of the unit C is modulated by a signal proportional to the fuel-to-air ratio.

The Machmeter includes a diaphragm 104 subjected on the upper side to Rayleigh pressure $P'_0$, and on the lower side to the pressure in a chamber 106. Air at a pressure $P'_2$, derived from a forward-facing pitot tube (not shown) located upstream or downstream of the normal shock wave 14, is supplied to this chamber through a fixed restrictor 108, and can leave the chamber through an outlet controlled by a needle 114 connected to the diaphragm 104. The needle 114 is linked to the needle 136 in the dashpot unit N.

The variable plug 12 controlling the nozzle area of the engine A is controlled by a ram 76, controlled by a spool valve 78 in the unit L. This valve 78 receives actuating fluid from a supply 80, and is itself controlled by a servo system consisting of pairs of pressure potentiometers 82, 84 and 86, 88. The upstream restrictions 82, 86 are on either side of a flapper 90, while the downstream restrictions 84, 88 are controlled by the spool valve, so that feed-back is obtained. The flapper 90 is loaded by springs 93, and is acted on by a diaphragm 92 subjected to the pressures $P_2$, $P_4$ upstream and downstream of the fuel metering valve F. It is also acted on by a further diaphragm 96, subjected on its lower side to Rayleigh pressure $P'_0$ and subjected on its upper side to a fraction of Rayleigh pressure $K_2P'_0$ determined by a pressure potentiometer consisting of a fixed restrictor 100 and a variable downstream restrictor 102 controlled by a needle 116 linked to the needle 136 and so to the Machmeter M. Thus in the unit L, since $P_2-P_4$ is proportional to the fuel flow and since the ratio of $P'_0$ to $K_2P'_0$ is dependent on the Machmeter M, the plug 12 is operated in response to the fuel-to-air ratio.

In the second system, shown in FIGURES 3 and 4, the units A, B, C and F are similar to those in the first system. The difference in the second system is that the restriction 134 in the dashpot unit N is controlled by a spool valve piston 52 which is part of a fuel-to-air ratio computer E, in place of a Machmeter. In fact, the displacement $x$ of the piston 52 is a measure of the fuel-to-air ratio, as will now be explained.

The piston 52 is moved by a servo system containing two pressure potentiometers, and using fuel as servo fluid. The upstream restrictions 56 and 58 of the potentiometers are on opposite sides of a flapper 60. This flapper is pivoted at 62, and is acted on by two resilient bellows. The upper bellows 64 is subjected to the pressures $P_2$ and $P_4$, upstream and downstream respectively of the fuel metering valve F. Thus the bellows 64 in the fuel-air ratio computer E applies to the flapper 60 a force proportional to fuel flow.

The lower bellows 68 is evacuated and subjected externally to the middle pressure of a pressure potentiometer constituted by restrictors 72 and 74. The upstream pressure is Rayleigh pressure $P'_0$, and the downstream pressure is static pressure $P_0$. The downstream restrictor 74 is a needle connected to the piston 52. The middle pressure is thus $K_1P'_0$, which is proportional both to the displacement $x$ of the piston 52 and to $P'_0$, which is itself a function of air flow $W_a$.

Considering now FIGURE 4, the resistance of the fuel sprays 8, in conjunction with the combustion pressure $P_3$, determines the back pressure $P_4$ in the fuel system. Then the metering valve F determines the pressure difference $P_2$–$P_4$, and hence the pressure $P_2$ upstream of the metering valve. The pressure difference $P_2$–$P_4$, and the pressure $K_1P'_0$ produce a displacement $y_3$ of the flapper 60 in accordance with the gain $G_1$. This produces displacement $x$ of the piston 52 in accordance with the gain $G_2/D$, and this is fed back, with gain $G_3$, via the needle 74.

The piston 52 thus takes up a displacement $x$ which is proportional to fuel-to-air ratio, thus controlling the gain of the restriction 134 in proportion to fuel-to-air ratio with the same consequences as in the system shown in FIGURES 1 and 2.

The principal features of the control system shown in FIGURES 1 to 4 are as follows:

A control system for a fluid-fuelled air-breathing engine and a forward-facing pitot tube for sensing displacement of the normal shock wave in the air intake of the engine and a forward-facing pitot tube for measuring Rayleigh pressure, also includes means for controlling the supply of fuel to the engine comprising:

(a) A main valve B controlled by first means C responsive to opposed signals from the reversed pitot tube means 16 and the forward-facing pitot tube 18 respectively and to a signal which is a function of rate of change of fuel flow through the main valve (b) And means for modulating the action of the first means in response to a signal which is a function of fuel-to-air ratio in the engine.

In the system shown in FIGURE 5, the fuel is fed to an engine A at a rate controlled by a main fuel valve B. The valve B is controlled by a critical control sensing unit C, the function of which is to ensure that the fuel flow is adjusted so as to maintain critical pressure recovery in the engine. The fuel flow through the valve B depends not only on the setting of the valve, but also on the pressure difference across it. This pressure difference is controlled by a gain control valve D in series with the main fuel valve B. This gain control valve D is under the control of a gain control sensing unit H, into which are fed signals representing the pressure drop across the main fuel valve B, and also a signal representing the fuel-to-air ratio in the engine. The significance of this is that the gain in the engine (that is to say the change in pressure within the combustion chamber for a given change in fuel flow), varies mainly with fuel-to-air ratio, and the system is arranged to reduce the gain of the main fuel valve B to compensate for increase of gain in the engine and vice versa. A fuel-to-air ratio computer E receives signals of Rayleigh pressure from a probe at the front of the engine, and also receives signals of fuel flow from a metering valve F in series with the valves B and D.

The components so far mentioned are arranged so that critical pressure recovery is maintained constant by regulation of fuel flow. The thrust of the engine is regulated by regulating the area of the exhaust nozzle of the engine A by means of a variable plug. The plug is controlled by a plug control L, which receives signals indicative of fuel-to-air ratio, and also receives signals from a Machmeter M.

The engine A has a supersonic inlet 202, and a subsonic diffuser 204, a combustor 206 with a fuel spray 208, and a nozzle 210 with a variable plug 212. For critical pressure recovery in the intake, a normal shock wave should be maintained at a position 214, and movements of this shock wave are detected by a system of reversed pitot tubes 216 abreast of the lip of the inlet 202. On the very front of the engine is a forward-facing pitot tube 218 for measuring Rayleigh pressure.

Fuel is supplied to the main fuel valve B at 220. The valve includes a piston member 222 controlling a port 224. The piston is displaceable by a servo system using fuel as the servo liquid. The upper and lower sides of the piston are exposed to the intermediate pressures in pressure potentiometers constituted respectively by restrictors 226, 228, 230, 232. The upsrteam restrictors 226 and 230 are fixed. The downstream restrictors 228 and 232 are differentially variable, because they are in the form of nozzles directed at opposite sides af a flapper 234 in the critical sensing unit C. The position of the flapper 234 is determined by the difference in pressures above and below a diaphragm 236 acting against a spring 238. The lower side of the diaphragm 236 is subjected to reversed pitot pressure $P_{RP}$. The upper side of the diaphragm is subjected to a pressure which is a fraction of the Rayleigh pressure $P'_0$. This fraction is produced by a pressure potentiometer consisting of restrictors 240 and 242, the downstream end of the potentiometer being subjected to static pressure $P_0$. The downstream restrictor 242 can be adjusted by a needle 244 in order to obtain a satisfactory mean position of the shock wave 214 in the engine intake.

Consider now in FIGURE 6 the servo loop through the units A, C and B. A displacement of the shock wave in the engine intake will cause a change in the reversed pitot presure $P_{RP}$. The difference between this and the selected fraction of Rayleigh pressure $K_0P'_0$ acts on the flapper 234 which is represented as having a gain $G_4$ so that a displacement $y_1$ occurs. This acts through the restrictors 228, 232 to produce, through a transfer function $G_5/D$, a progressive displacement $z_1$ of the piston member 222 in the main fuel valve B. This varies the area of the port 224 and thus, with a gain $G_6$, produces a fuel flow $W_f$ to the engine A. In the engine, a change in fuel flow produces a change in pressure $P_3$ in the combustion chamber 206, with a gain $G_E$. This, through a gain $G_D$ in the diffuser 204, produces a change in the reverse pitot pressure $P_{RP}$. In this servo loop, not all the gains are constant factors; for example the transfer function $G_5/D$ involves integration (D being a differential operator). However, what is most important in consideration of the stability of this servo loop is that the gain $G_6$ varies according to the magnitude of the pressure difference across the main fuel valve B, namely $P_D$–$P_1$, and the gain $G_E$ in the engine depends on the ratio of the rate of flow of fuel $W_f$ to the rate of flow of air $W_a$.

Now, in practice, the supply of fuel is derived from a pump, the delivery pressure of which drops considerably as the altitude at which the system is operating increases. In addition, it is found that, over the range of possible conditions of operation of the engine, the engine gain $G_E$ may vary by a factor of 5. For stability of the system, it is desirable that the total gain round the loop should not fluctuate by more than about plus or minus 20%, but, in the absence of some system of compensation, very much greater fluctuations will occur.

The present system functions by controlling the pressure $P_1$ downstream of the fuel valve B in such a way that, if the supply pressure $P_D$ should vary, then an identical change takes place in $P_1$, and if the fuel-to-air ratio of the engine should vary, then an additional change in $P_1$ is made so that the gain $G_6$ of the main fuel valve B is reduced to an extent to compensate for increase in the engine gain $G_E$ or vice versa.

The gain control valve D has the same structure as the main fuel valve, and includes a piston member 322 controlling a port 324. It is likewise controlled by a pair of pressure potentiometers, with downstream restrictions 241 and 243 on opposite sides of a flapper 245 in the gain control sensing unit H. The position of this flapper is determined by the pressure difference across a bellows 246 acting against a spring 248. The pressure difference across the bellows 246 is $P_D$–$P_1$, i.e., the pressure difference across the main fuel valve B. The stress in the spring 248 is variable by means of a movable abutment 250 controlled by a piston 252 in the fuel-to-air ratio computer E. In fact, the displacement $x$ of the piston 252 is a measure of the fuel-to-air ratio, as will now be explained.

The piston 252 is moved by a servo system containing two pressure potentiometers, and using servo fluid from a source 254. The downstream restrictors 256 and 258 of the potentiometers are on opposite sides of a flapper 260. This flapper is pivoted at 262, and is acted on by four resilient bellows. The right hand pair of bellows 264, 266 are subjected to pressures $P_2$ and $P_4$, upstream and downstream respectively of the fuel metering valve F. This valve is of a known type constructed so that the pressure drop across it is directly proportional to the flow through it. It contains a spring-loaded member 267 controlling an orifice 270$a$, through which fuel flows on its way to the engine. The pressure drop $P_2$–$P_4$ across the valve F is a function of fuel flow $W_f$ and of the displacement $x_2$ of the member 267, with gain $G_7$, and the displacement $x_2$ of the member 267 is in turn a function of the pressure drop, with gain $G_{14}$. The valve is so designed that $P_2$–$P_4$ is in fact directly proportional to $W_f$. Thus the bellows 264 and 266 in the fuel-air ratio computer E apply to the flapper 260 a force proportional to fuel flow.

The bellows 268 is subjected to Rayleigh pressure $P'_0$, which is a measure of air flow through the engine. The bellows 270 introduces feed-back; it is connected to the middle of a pressure potentiometer constituted by restrictors 272 and 274. The upstream pressure is Rayleigh pressure $P'_0$, and the downstream pressure is static pressure $P_0$. The downstream restrictor 274 is a needle connected to the piston 252.

Considering now FIGURE 6, the resistance of the fuel sprays 208, in conjunction with the combustion pressure $P_3$, determines the back pressure $P_4$ in the fuel system. Then the metering valve F determines the pressure difference $P_2$–$P_4$, and hence determines the pressure $P_2$ upstream of the metering valve. The pressure difference $P_2$–$P_4$, and the Rayleigh pressure $P'_0$ are fed into the fuel-air computer E and produce a displacement $y_3$ of the flapper 260 is accordance with the gain $G_1$. This produces displacement $x$ of the piston 252 in accordance with the gain $G_2$, and this is fed back, with gain $G_3$, via the needle 274.

In the gain control sensing unit H, the displacement $x$ determines the stress in the spring 248, with gain $G_{10}$, and this, together with the pressure difference $P_D$–$P_1$, produces the displacement $y_2$ of the flapper 245, with gain $G_{11}$. This in turn produces displacement $z_2$ of the piston member 322 of the gain control valve D, with a transfer function $G_{12}/D$. This displacement determines the area of the port 324 and hence determines $P_1$–$P_2$ for the given fuel flow $W_f$, with gain $G_{13}$. $P_2$ having been determined by the metering valve F, $P_1$ is determined and is applied to the downstream side of the main fuel valve B.

The variable plug 212 controlling the nozzle area of the engine A is controlled by a ram 276, controlled by a spool valve 278 in the unit L. This valve 278 receives actuating fluid from a supply 280, and is itself controlled by servo system consisting of pairs of pressure potentiometers 282, 284 and 286, 288. The upstream restrictions 282, 286 are on either side of a flapper 290, while the downstream restrictions 284, 288 are controlled by the spool valve, so that feed-back is obtained. The flapper 290 is very similar to the flapper in the fuel-air ratio computer E. This is to say, it is acted on by a pair of resilient bellows 292, 294 subjected to the pressures $P_2$, $P_4$ upstream and downstream of the fuel metering valve F, and it is acted on by a further bellows 296, subjected to Rayleigh pressure $P'_0$. In addition, it is acted on by a further bellows 298 which is subjected to a fraction of Rayleigh pressure determined by a pressure potentiometer consisting of a fixed restrictor 300 and a variable downstream restrictor 302 controlled by the Machmeter M.

The Machmeter includes a diaphragm 304 subjected on the upper side to Rayleigh pressure, and on the lower side to the pressure in a chamber 306, and without spring loading. Air at a pressure $P'_2$ derived from a forward-facing pitot tube (not shown) located upstream or downstream of the normal shock wave 214, is supplied to this chamber through a fixed restrictor 308, and can leave the chamber through two outlets controlled by needles. One needle 310 is actuated by bellows 312 which is evacuated and subjected to static pressure $P_0$ externally, and the other needle 314 is connected to the diaphragm 304. In addition, the diaphragm 304 is linked to a needle 316 controlling the restrictor 302, and thus determining the fraction $K_3$ of the pressure $P'_0$ acting in the bellows 298 in the unit L.

The principal features of the control system shown in FIGURES 5 and 6 are as follows:

A control system for a fluid-fuelled air-breathing engine, including a reversed pitot tube for sensing displacement of the normal shock wave in the air intake of the engine and a forward-facing pitot tube for measuring Rayleigh pressure, also includes means for controlling the supply of fuel to the engine comprising:

(a) A main valve B controlled by first means C responsive to opposed signals from the reversed pitot tube 216 and the forward-facing pitot tube 218 respectively (b) And in series with the main valve a gain control valve D for adjusting the pressure of the fuel between the two valves, and hence the pressure drop across the main valve B, (c) The gain control valve being controlled by second means H responsive to a function of the fuel-to-air ratio in the engine, such that (d) If the fuel-to-air ratio varies, the pressure drop across the main valve B is adjusted, in the sense to reduce the gain of the main valve when the engine gain is increased and vice versa.

The gain control valve may be upstream or downstream of the main valve; a downstream position is preferred in practice.

We claim:

1. An aircraft power plant including: a fluid-fuelled air-breathing jet engine suitable for operation with supersonic airflow speeds at intake; a main valve arranged to control fuel flow to the engine; means arranged to regulate the exhaust nozzle area of the engine; a reversed pitot tube arranged for sensing displacement of a normal shock wave in the air intake of the engine; and a control system including means which interconnects the main valve and the pitot tube so that they are in a closed servo loop which regulates fuel flow in a manner tending to maintain intake operation of the engine at critical pressure recovery; the control system also including means, associated with the servo loop, by which the fuel system gain is compensated for variations in engine gain.

2. A power plant according to claim 1, including: a forward-facing pitot tube arranged to measure Rayleigh pressure; first means controlling the main valve and responsive to signals from the reversed pitot tube and from the forward facing pitot tube, and to a signal which is a function of rate of change of fuel flow through the main valve; and means for modulating the action of the first means in response to a signal which is a function of fuel-to-air ratio in the engine.

3. A power plant according to claim 2, including a unit consisting of a fuel metering valve, in series with the main valve, having a member which is displaced to an extent proportional to fuel flow, and which is connected to a dashpot piston in a cylinder, the two ends of which are interconnected through a restriction, the pressure difference across the restriction being applied to the first means.

4. A power plant according to claim 3, in which the area of the restriction is variable under the control of a Machmeter.

5. A power plant according to claim 3, in which the area of the restriction is variable under the control of a fuel-to-air ratio computer.

6. A power plant according to claim 1, including: a forward-facing pitot tube arranged to measure Rayleigh pressure; first means controlling the main valve and responsive to signals from the reversed pitot tube and from the forward-facing pitot tube; and in series with the main valve a gain control valve for adjusting the pressure of the fuel between the two valves, and hence the pressure drop across the main valve, the gain control valve being controlled by second means responsive to a function of the fuel-to-air ratio in the engine, such that if the fuel-to-air ratio varies, the pressure drop across the main valve is adjusted, in the sense to reduce the gain of the main valve when the engine gain is increased and vice versa.

7. A power plant according to claim 6 in which the gain control valve is downstream of the main valve.

References Cited by the Examiner

UNITED STATES PATENTS

| 2,956,398 | 10/1960 | Muhlfelder | 60—39.28 X |
| 3,078,658 | 2/1963 | Sargent | 60—39.28 X |
| 3,273,338 | 9/1966 | Rimmer | 60—235 |

JULIUS E. WEST, *Primary Examiner.*